June 10, 1958     C. PAGE ET AL     2,838,161
EGG HANDLING MACHINE
Filed Jan. 16, 1950     5 Sheets-Sheet 2

INVENTORS
CLARENCE PAGE
GEORGE A. PAGE
BY
ATTORNEYS

June 10, 1958  C. PAGE ET AL  2,838,161
EGG HANDLING MACHINE
Filed Jan. 16, 1950  5 Sheets-Sheet 3
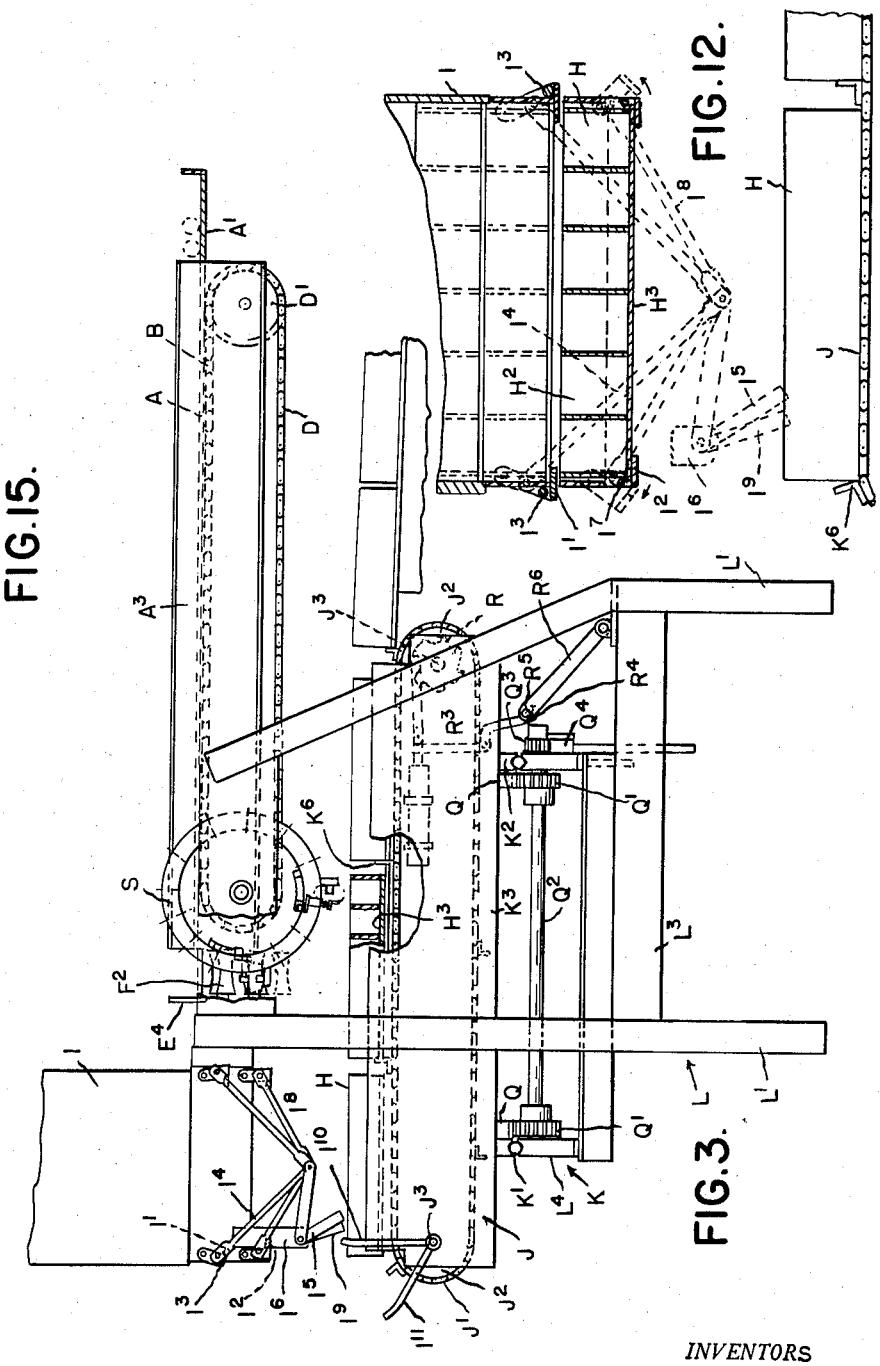
INVENTORS
CLARENCE PAGE
BY GEORGE A. PAGE
ATTORNEYS June 10, 1958
C. PAGE ET AL
2,838,161
EGG HANDLING MACHINE
Filed Jan. 16, 1950
5 Sheets-Sheet 4
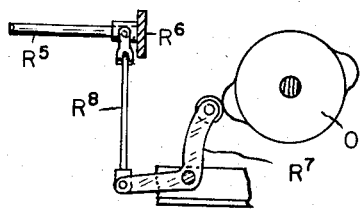
FIG.11.
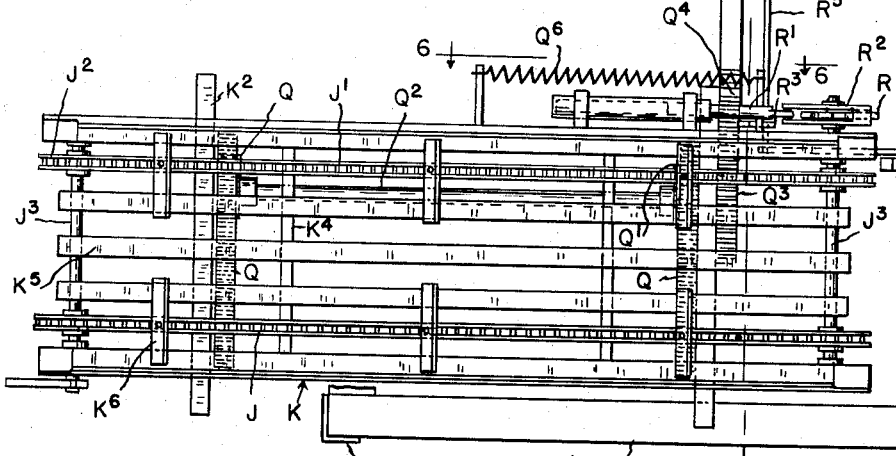
FIG.4.
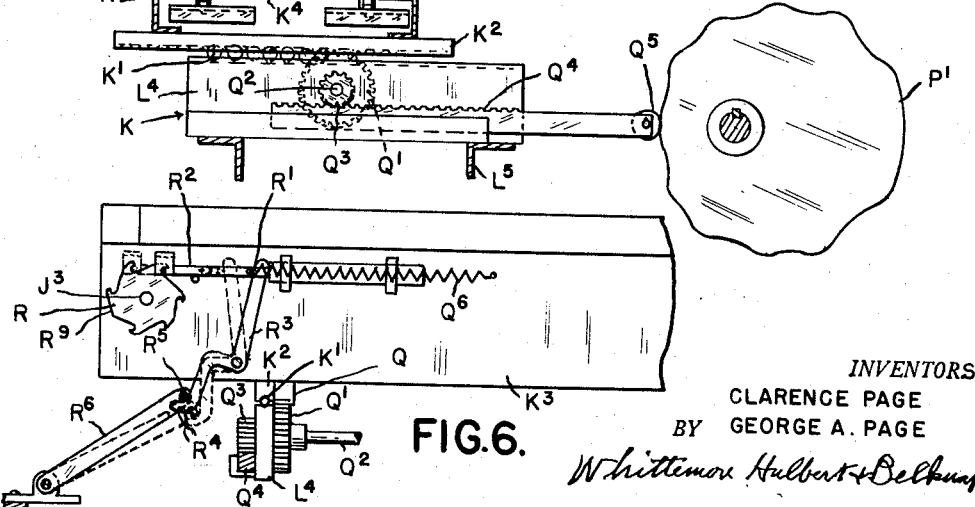
FIG.5.
FIG.6.
INVENTORS
CLARENCE PAGE
BY GEORGE A. PAGE
ATTORNEYS

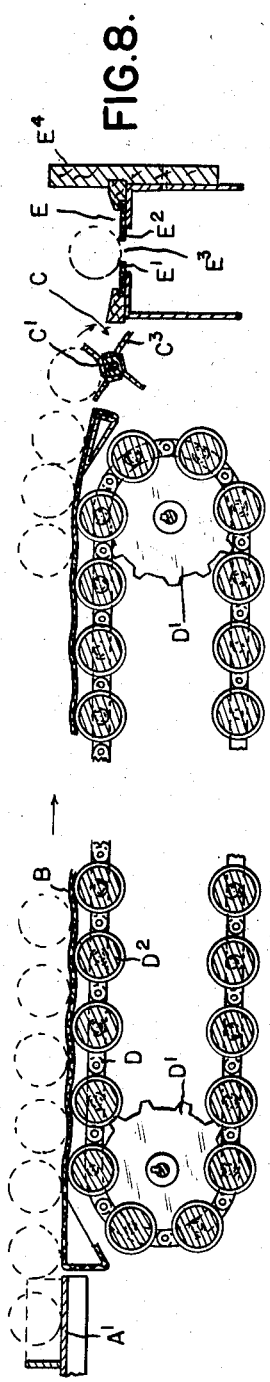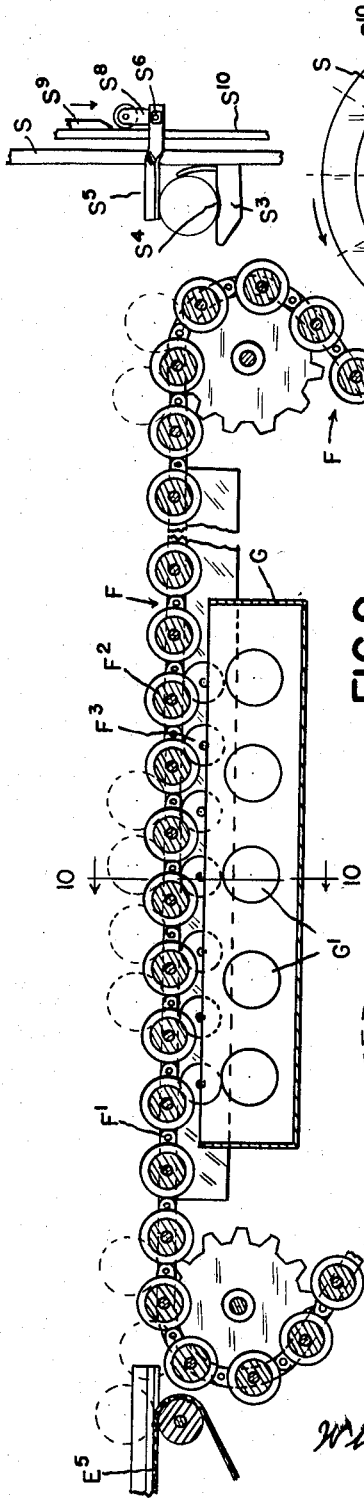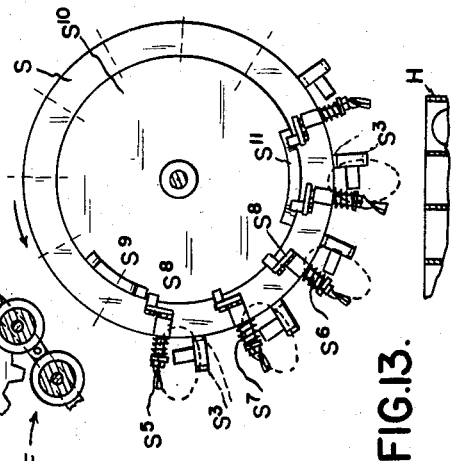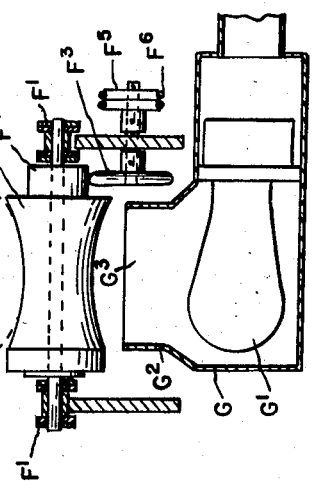

2,838,161

EGG HANDLING MACHINE

Clarence Page and George A. Page, Detroit, Mich., assignors to Page-Detroit, Inc., Southfield Township, Mich., a corporation of Michigan Application January 16, 1950, Serial No. 138,714

12 Claims. (Cl. 198—32)

The invention relates to a mechanism for handling eggs and the placing of the same in cartons for merchandising.

It is the object of the invention to obtain a construction which is completely automatic in that it receives the eggs from a reservoir or supply, and successively places them in the individual cells of cartons which have been successively positioned to receive the same and are delivered when filled.

It is a further object to incorporate in this mechanism a candler, which in no way interferes with the progress of the eggs from source to the point of delivery.

To this end the invention consists generally in means for separating from a mass an aligned series of eggs, advancing said series and successively dropping the foremost egg of the series into a registering cell of a carton.

The invention further consists in incorporating with such mechanism a candler which provides for inspection of the eggs and removal of defectives without interference with the general advancement of the series.

Further features of the invention are the more specific construction of the series separating means; the means for turning each egg from horizontal to vertical arrangement of its major axis prior to the dropping of the same; the means for the successive registration of the cells of each carton with the dropping point to receive an egg therein; and other specific features as more fully hereinafter set forth.

In the drawings:

Fig. 3 is an end elevation;

Fig. 4 is a plane view of the carriage and operating mechanism therefor;

Fig. 5 is a section on line 5—5, Fig. 4;

Fig. 6 is a section on line 6—6, Fig. 4;

Fig. 7 is an elevation parallel to line 7—7, Fig. 1;

Fig. 8 is a section on line 8—8, Fig. 1;

Fig. 9 is a section on line 9—9, Fig. 1;

Fig. 10 is an enlarged cross section on line 10—10, Fig. 9;

Fig. 11 is a section on line 11—11, Fig. 4;

Fig. 12 is a vertical section through a portion of the carton magazine showing the mechanism for successively dropping the cartons;

Fig. 13 is an elevation of the egg depositing mechanism viewed from the rear;

Fig. 14 is a section on line 14—14, Fig. 7 on a larger scale; and

Fig. 15 is an elevation of one of the sprially grooved rollers identified by the reference character.

Figure 1:
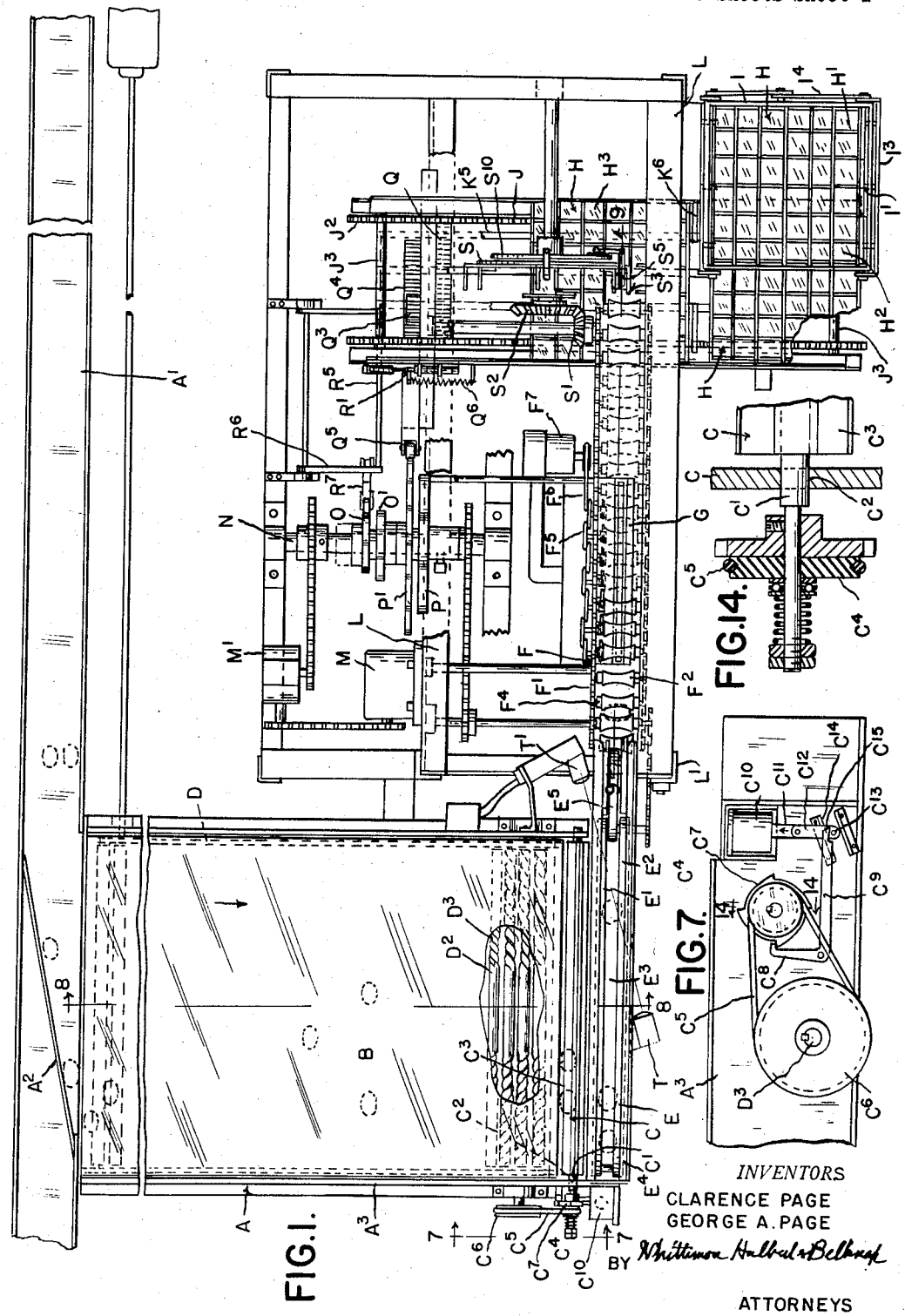
Fig. 1 is a plan view of the machine.
Figure 2:
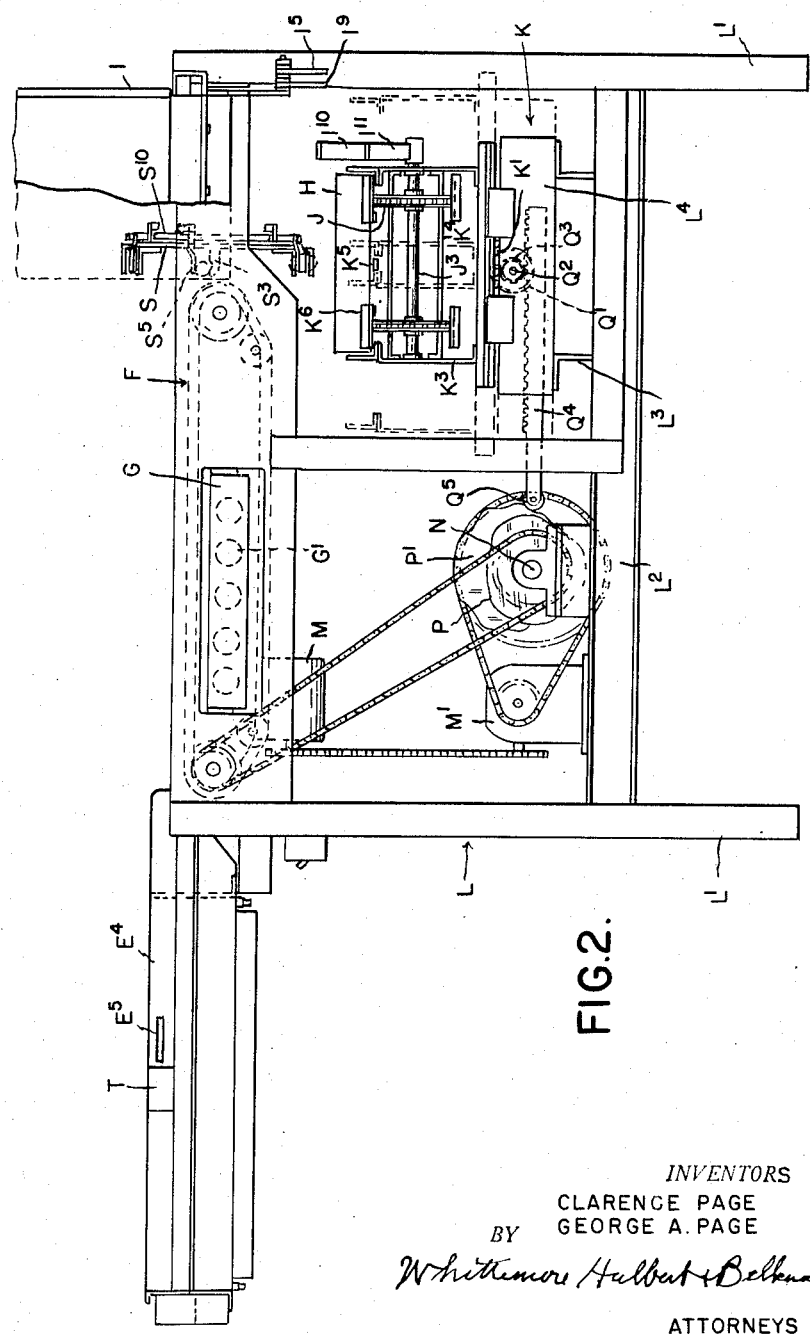
Fig. 2 is a front elevation thereof.

In the handling of eggs preparatory to merchandising, they are preferably first graded as to size and are then placed in holders which are usually of dozen size for retail sale, three-dozen size for wholesale and in some localities two and one-half dozen size. At some point in the handling, the eggs are candled or inspected and those found defective are removed. The mechanism forming the subject matter of the instant invention is designed to handle eggs which may have been previously graded but not candled and, as above stated, it is the object to secure completely automatic operation from this point to the delivery of the filled cartons.

In general construction the machine comprises a table A on which eggs are first deposited from any suitable source of supply. As shown a conveyor belt A' carries the eggs (preferably previously graded) across one end of the table A, and an inclined bar $A^2$ transfers them from the belt onto said table. This table has side rails $A^3$ for retaining the eggs thereon and is further provided with a soft flexible cover sheet B on which the eggs rest. At one end of the table is a gate C which is intermittently operated to permit the passage of a single row of eggs and the depositing of the same upon an adjacent, longitudinally traveling conveyor. To maintain the eggs on the table in operative relation to the gate, they are slowly advanced by means placing only a slight pressure against the individual eggs so as to avoid danger of breakage. This advancing means consists in an endless conveyor D passing around sprockets D' and having a series of bars or rollers $D^2$ extending transversely across the table. The flexible sheet B rests upon the rollers $D^2$ of the upper portion of the conveyor, which is traveling in the direction of the arrow or from the outer end of the table towards the gate C. As the sheet B is very flexible the eggs resting thereon will press it down between adjacent rollers and during advancement of the conveyor these rollers will propel the eggs forward. However, if there is any obstruction such as an accumulation of the eggs adjacent to the gate, the pressure exerted by the conveyor is too slight to endanger breakage. In other words, the eggs will be merely lifted and lowered as the rollers pass under the same, but whenever they are free to advance the forward pressure will be sufficient for this purpose. Some or all of the rollers $D^2$ preferably have grooves $D^3$ in the opposite and peripheral portions thereof with a helical shoulder at one edge of the groove for propelling the eggs from opposite sides towards the center of the table A. This is desirable for concentrating the eggs so as to leave no gaps in the series separated by the gate. The soft flexible cover B is secured to bars B' and $B^2$ at opposite ends of a conveyor D and the bar $D^2$ which is adjacent to the gate C is transversely slightly inclined downwardly towards said gate to facilitate movement of the eggs against the latter.

Row advancing means

The gate C is preferably formed as shown in Fig. 8 and comprises a rotary shaft C' journaled in bearings $C^2$ at its opposite ends and having intermediate said bearings a plurality of radially extending flanges $C^3$. Normally one of said flanges is in a substantially horizontal plane adjacent to the slightly inclined bar $C^2$ at the end of the conveyor D to receive eggs therefrom. Another flange extends upward in the path of the eggs, so that it is only when the roller is rotated through an angle of 90° or thereabouts that eggs can pass the gate. Such rotation is controlled by means which will later be described, and it operates only when more eggs are required to complete a longitudinally advancing series. Such series is formed by successive rows of eggs removed from the table A and deposited on a traveling conveyor E on the opposite side of the gate. The conveyor E comprises a pair of spaced, parallel, endless belts E', $E^2$ having their upper strands extending in a horizontal plane slightly lower than the gate C so that the eggs in the row transferred by the gate will roll down onto the belts over a bar $E^6$ which is in the inclined plane of the bar $B^2$. Thus, there will be no dropping of the eggs to cause breakage. The space $E^3$ between the belts permits the eggs to drop slightly therein so as to be supported by the belts on the opposite sides thereof. A rail $E^4$ parallel to and on the outer side of the belts retains the eggs from dropping off, and therefore the row or series will be advanced longitudinally thereof. Each of the spaced belts $E'$, $E^2$ will advance or turn an egg in contact therewith and this prevents any clogging which might otherwise occur when eggs are deposited by the gate C. A single central belt $E^5$ extends forward from the belts $E'$ and $E^2$ to continue the advancement of the series which might extend to the point where the eggs are to be deposited in the cartons but preferably we interpose a candler of the following construction.

Candler

F is an endless conveyor in alignment with the conveyor E, which is formed by spaced chains $F'$ having spaced hour-glass shaped rollers $F^2$ extending therebetween. The eggs from the conveyor E will be deposited between pairs of adjacent rollers $F^2$ and, during the forward progress of the upper strands of the chains $F'$, will be moved over the candler. This consists of a box G containing electric light bulbs $G'$, said box being open at the top for the passage of an upwardly directed beam of light centrally beneath the row of eggs on the conveyor F. During the interval in which the rollers $F^2$ are passing over the box G, rotary motion is intermittently imparted to these rollers to spin the eggs supported thereon. As shown in Figs. 9 and 10, a series of constantly rotating friction wheels $F^3$ are arranged beneath the portion of the conveyor F which passes over the box G. These wheels are in the path of cooperating friction wheels $F^4$ at the end of each roller $F^2$ and are adapted in the progress of the conveyor to raise each roller and impart rotary motion thereto while passing over the corresponding friction roller $F^3$. As a result adjacent rollers will spin the egg supported therebetween while passing over the friction wheels $F^3$, but will cease to rotate during the intervals in which the friction wheels $F^4$ pass between the adjacent friction wheels $F^3$. Rotation thus imparted to the egg will be communicated to the fluid within the shell and, when rotation of the shell ceases, the interior fluid will continue to rotate. Thus the inspector viewing the egg from the top as illuminated by the light beam will detect any imperfections in the interior of the egg as the fluid therein continues its rotation. Every egg on the conveyor F is successively subjected to this inspection and the time interval for passing over the box G is sufficiently long for the careful observation of each. The friction wheels $F^3$ are driven by pulleys $F^5$ on the shafts thereof and belts $F^6$, which in turn are driven by a small electric motor $F^7$ mounted on the frame of the machine.

The advancing row of eggs after passing the candler will come into operative relation to the depositing means, but before describing the latter we will first describe the carton handling means. As above stated, the eggs are usually held in either dozen, two and one-half dozen or three-dozen lots. The holders for the dozen lots provide two rows of six cells each, while the holders for the three-dozen lots have six rows of six cells each and are of equal dimensions in length and width. We will therefore describe the mechanism for handling the three dozen cartons with the understanding that adjustment can be easily made to similarly handle cartons for different numbers of eggs.

Carton conveying means

The cartons H are usually formed of cardboard strips having spaced transverse slits therein for cross engagement with each other to form a series of cells. In the three-dozen carton, there are six transversely extending rows $H'$ of six cells $H^2$ in each row. There is also a bottom sheet $H^3$ which extends under all of the cells and affords support for the eggs therein. These cartons are placed in vertical series within a magazine I from which they are periodically dropped upon a carton conveyor J and are intermittently advanced by the latter from row to row. The conveyor J is mounted on a transversely movable carriage K which in turn is mounted on a frame L supporting the magazine I and most of the mechanism thus far described. This frame includes corner post members $L'$ and longitudinal and transverse bars connecting the same. The conveyors C and F are mounted on the upper portion of this frame, but the carriage K and conveyor J are at a lower level being mounted primarily on bars or beams $L^2$ which extend in the direction of the conveyors C and F. Cross bars $L^3$ are mounted on the beams $L^2$ and track members $L^4$ are mounted upon and extend transversely of the bars $L^3$. These track members are grooved along their upper edges to receive balls $K'$, and the carriage K is provided with bars $K^2$ grooved on their lower edges to engage and rest upon the balls $K'$. This forms a roller bearing support for the carriage K which permits the latter to move with slight frictional resistance back and forth on the track members $L^4$. The upper part of the carriage K is formed by side channel bars $K^3$ and cross bars $K^4$. There is also a slatted top $K^5$ supported on the cross bars $K^4$, which top forms the direct support for the cartons. The conveyor J is formed by endless chains $J'$ passing around sprockets $J^2$ on shafts $J^3$ located at the forward and rear end of the side bars K. The chains pass around the cross bars $K^4$ but are below the slatted top $K^5$. However, bars $K^6$ attached to the chains and spaced to receive a carton therebetween pass over the slatted top to move the cartons resting thereon. The arrangement of the carriage K and conveyor J is such that the cartons can be intermittently advanced longitudinally and transversely to successively register the cells thereof with the point where the eggs are dropped into engagement therewith. Such intermittent movements are effected by the following mechanism.

Mounted on the frame L is a motor M, which is connected through a reduction transmission $M'$ with a shaft N rotated at low angular speed, such as 4 R. P. M. On the shaft N are pairs of cams O, $O'$ and P, $P'$. The cams O and $O'$ are alternatively used for intermittently actuating the carriage K, the cam O being used for the filling of three-dozen size cartons and the cam $O'$ for the one-dozen. Thus these cams, which are splined to the shaft N, may be adjusted thereon to bring them alternatively in operative relation with the cooperating mechanism. The carriage K has secured to its underside a pair of spaced parallel rack bars Q, which engage pinions $Q'$ on a shaft $Q^2$ journaled in bearings in the track members $L^4$. The shaft $Q^2$ has also a pinion $Q^3$ thereon which is of smaller diameter and is engaged with a rack bar $Q^4$. The rack bar $Q^4$ has attached to one end thereof a roller $Q^5$ which forms a follower engaging the periphery of one or the other of the cams O, $O'$. A spring $Q^6$ engaging the rack bar $Q^4$ urges the same in a direction to maintain the follower $Q^5$ in contact with the periphery of the cam. The cams are fashioned to impart intermittent movements to the rack bar, which through the pinion $Q^3$ rotates the shaft $Q^2$, and through the pinions $Q'$ imparts movement to the rack bars Q and through the latter to the carriage K. By reason of the fact that the pinions $Q'$ are larger than the pinion $Q^3$, the amplitude of movement imparted to the carriage is greater than that which could be produced by the rack bar $Q^4$ and this permits of using cams of smaller diameter. Each of the intermittent movements of the carriage is equal to the dimension between adjacent cells of the carton, and the total number of movements in one direction is equal to the number of cells in one row of the carton which in the construction illustrated is six but may be any number by a suitable change in cams. After these six movements, the carriage J is advanced (by means later described) to bring another row of cells in alignment with the egg depositing point, and the carriage will then be moved in the reverse direction under the actuation of the spring $Q^6$ to perform six more intermittent advancements. This completes the cycle of the cam, which after another movement of the conveyor repeats the cycle and so on until all of the cells of the carton are filled. For intermittently actuating the conveyor J to advance the cartons from row to row, one of the shafts J³ has mounted thereon a ratchet wheel R. A rod R' slidable in bearings on the carriage has attached to one end thereof a pawl R² engaging the teeth of said ratchet wheel to intermittently rotate the same and, through its shaft and the sprocket wheel thereon, actuate the conveyor. The rod R' is itself actuated by a lever R³ having its end portion R⁴ slidably engaging a rod R⁵ on a rockable member R⁶, which latter is actuated from one or the other of the cams O and O' through the medium of a bell crank lever R⁷ and connecting rod R⁸. The rod R⁵ is of sufficient length so that the portion R⁴ of the lever R³ will remain in engagement therewith in all positions of the carriage K. Thus after one row of cells has been filled with eggs and the carriage is at that end of its movement, the conveyor J is actuated to bring another row in alignment with the depositing means, and when this row is completely filled and the carriage is at the opposite end of its movement, the conveyor is similarly advanced to bring another row in alignment. However, in passing from one carton to another the space between the cells is somewhat greater as there is a feed bar K⁶ betwen adjacent cartons. The required additional movement is supplied by making the distance between the teeth of the ratchet wheel at one point R⁹ greater than between the other teeth.

Carton holding magazine

The magazine I is open at the top and is of a cross sectional area to receive a stack of cartons, each carton including a cellular portion and a bottom portion. The lowermost carton of the series rests upon fingers I' which are periodically withdrawn to drop the series to a lower position supported by other fingers I², after which the upper fingers I' are reinserted between the lowermost carton and the next higher one of the series. The fingers I² are then withdrawn to drop the freed lowermost carton onto the conveyor J. The mechanism for operating the fingers I' and I² is illustrated in Figs. 3 and 12 and comprises a pair of rocker members I³ to which the fingers I' are attached, said rocker members being pivotally mounted upon opposite sides of the magazine I. The rods I⁴ extend from these rocker members to a bell crank lever I⁵ pivotally mounted on a bracket I⁶ depending from the magazine. Normally the fingers I' are projected to support the stack of cartons, but a movement of the bell crank lever I⁵ to raise the rods I⁴ will actuate the rockers I³ to withdraw the fingers I' and permit the stack to drop until movement is arrested by the fingers I². The latter are preferably formed integral with rocker members I⁷ similarly arranged on the magazine beneath the rocker members I³ and similarly operated by rods I⁸ and a bell crank lever I⁹. Thus after the actuation of the bell crank lever I⁵, which relieves the fingers I' and permits the stack of cartons to drop, said fingers will be reinserted beneath the bottom member of the next higher carton. Subsequently, the bell crank lever I⁹ will be actuated to release the fingers I² and drop the lowermost carton onto the slatted top of the carriage. The bell crank levers I⁵ and I⁹ are successively actuated by arms I¹⁰ and I¹¹ both mounted on the shaft J³ at the forward end of the conveyor J. Once in each cycle of this shaft, these arms will successively actuate the said bell crank levers with the result that a carton is deposited on the carriage. The timing is such that a carton is thus deposited as soon as space is provided by the advancement of a previously deposited carton through the operation of the conveyor J. The mechanism just described is only one specific construction and other means for successively releasing cartons from the mechanism may be substituted therefor.

Egg depositing mechanism

The eggs advanced through the candler as previously described are spaced from each other by the rollers F² of the conveyor F and thus successively reach the forward end of said conveyor. At this point they are received by the depositing mechanism which is of the following construction. A rotary wheel S is arranged in a plane transverse to the direction of advancement of the conveyor F and is driven from the latter through the medium of bevel gear wheels S' and S². The wheel S has mounted thereon a series of egg-holding clamps which are successively registered with the conveyor F to receive an egg therefrom and then carry it around with the wheel through an angle of 90° to the point where the egg is released and dropped into a cell of the carton. Each of the clamps of the series includes a pair of spaced fingers S³ which, when registered with the conveyor J, will be slightly below the upper portion thereof and opposite the portion passing around the sprocket. This will permit the egg to roll off from its seat between rollers F² onto the fingers S³, which are slightly concaved on their upper edges at S⁴. A cooperating finger S⁵ will then clamp the egg and hold it until it reaches the point for deposit. The finger S⁵ is on a rock shaft S⁶ mounted on the wheel S and a spring S⁷ biases said finger towards clamping position. However, an arm S⁸ on the shaft S⁶ engages a cam S⁹ on a stationary plate S¹⁰ and the cam is so positioned that the finger S⁵ is retracted when the egg is deposited on the fingers S⁴ and is then released to clamp it. After the wheel S has traveled through an angle of approximately 90° another cam S¹¹ on the plate S¹⁰ will release the finger S⁵ permitting the egg to drop into the registering cell of the carton. In this travel of the wheel the egg is turned so that its major axis, which was horizontal on the conveyor J, is vertical when the egg is released to drop into the cell.

Means for filling gaps in the advancing series of eggs

By reason of the fact that the series of eggs passes through the candler and that some eggs are removed, this would leave gaps in the series which if not filled would leave certain cells of the cartons unfilled. To avoid such a result we provide mechanism for advancing the series towards the candler at a faster rate than from there on. Such advancement is by the belts E', E² and E⁵, which travel faster than the conveyor F. However, the series on the belts is only frictionally driven and therefore will not advance faster than necessary. Whenever the operator of the candler removes an egg from the conveyor F, which he accomplishes by his right hand, he at the same time uses his left hand to advance the series from the belt E⁵ over the conveyor F. As the eggs are rotating when passing through the candler they can be easily advanced by the slight additional force supplied through the left hand of the operator. In this manner all gaps are filled before the series reaches the depositing mechanism.

Automatic gate control

The transfer of eggs from the table A is accomplished by the operation of the gate C as has been previously described. It is necessary, however, to control this operation so that eggs will be supplied to the series only as fast as required, which is accomplished as follows. The shaft C' is of the gate has revolubly mounted on one end thereof a pulley C⁴ which is connected by a belt C⁵ with a pulley C⁶ on the shaft D³ of the endless conveyor D, but this does not necessarily communicate rotation to the shaft C'. The latter is always rotating when the machine is in operation as is also the belt C⁵ and pulley C⁴. Mounted on this shaft in frictional contact with one side of the pulley C⁴ is a ratchet wheel C⁷ which, however, is normally held against rotation by a dog C⁸ engaging one of the teeth of said ratchet wheel. There are four of these teeth equally spaced and, therefore, when the dog is released, the pulley C⁴, shaft C' and ratchet wheel will be rotated through one-quarter of a revolution turning the gate C the same amount. The dog C⁸ has a bell crank arm C⁹ and a solenoid, or other electromagnetic motor, C¹⁰ when energized will move this bell crank arm to release the dog. Operation of the solenoid C¹⁰ is controlled by the eggs on the conveyor E, the arrangement being such that any gap in the series will close a switch energizing the motor. This switch is preferably operated by a light sensitive electric cell T which in turn is operated by a beam of light extending transversely of the conveyor and interrupted by the eggs carried by the conveyor. As shown an electric lamp T' is mounted to project a light beam diagonally across the conveyor E and through an aperture E⁶ in the rail E⁴ into the cell T. This beam is, however, interrupted by eggs on the conveyor E, and it is only when there is an open gap that the beam is effective to operate the cell T and through the latter to energize the solenoid C¹⁰. Thus whenever the supply of eggs deposited on the conveyor E is exhausted, the gate will be operated to deposit another series on said conveyor. In this way the supply of eggs to the candler and to the depositing mechanism is automatically maintained. It is necessary, however, that the dog C⁸ when released from one ratchet tooth should be instantly returned to engage the next tooth of the ratchet wheel, which is accomplished as follows. The movable core C¹¹ of the solenoid has a link C¹² pivotally attached thereto an the lower end of this link has a pin C¹³ for engaging the bell crank arm C⁹ to release the dog. However, an extension of the pin C¹³ engages an inclined track C¹⁴ so that in the further upward movement of the core C¹¹ the pin will be disengaged from the arm C⁹. This permits the arm to drop thereby re-engaging the dog with the ratchet wheel when the solenoid is de-energized and the core C¹¹ and link C¹² drop the pin C¹³ engaging an inclined end C¹⁵ of the arm C⁹ will be deflected to pass beneath the other so as to be in position for another operation.

*Operation*

From the description above, the operation of the machine will be understood, but it may be briefly restated as follows. Eggs traveling on the conveyor A' are transferred therefrom by the inclined bar A² to the table A on top of the flexible cover B. The traveling conveyor D beneath the cover B will cause the advancement of the eggs over the table towards the gate C, but the force exerted is not sufficient to endanger breakage. The gate is operated by the mechanism above described whenever there is a gap in the series of eggs on the conveyor E to transfer another row of eggs from the table A onto said conveyor. The latter will advance the series to the conveyor F, which carries them through the candler. The hour-glass shaped rollers F² of the conveyor F are intermittently rotated by passing over the friction wheels F³ which are in constant rotation, being driven by the motor F⁷, pulleys F⁵ and belts F⁶. Thus as the eggs pass over the light beam from the light bulbs G' in the box G, they are inspected and when they are bad are removed from the series. The gap is then refilled by the inspector, who manually advances the series over the rollers F². At the end of the conveyor F, the eggs are successively transferred to the clamping holders on the wheel S and are carried thereby into position for dropping into the cells of the cartons. During this transfer the long axis of the egg is changed from horizontal to vertical, and the clamping and unclamping of the holders is effected by cams on the stationary plate S¹⁰. The cartons stacked in the magazine I are successively dropped therefrom onto the carriage K and are intermittently advanced longitudinally thereover by the conveyor J. Such advancement is only from row to row of cells in the carton while the step by step transverse movement of the carriage successively registers the cells in each row with the egg dropping point. In this manner all of the cells in each carton are filled with eggs and the filled cartons are delivered from the rear end of the carriage. The mechanism for effecting these movements has been previously fully described and it is unnecessary to repeat the description of the same.

What we claim as our invention is:

1. In a machine for handling eggs, a stationary flexible sheet on which the eggs are deposited en masse, an endless series of advancing rollers beneath said sheet forming a support for the eggs between adjacent rollers adapted to exert a limited forward pressure thereon, and a gate for temporarily arresting movement of the eggs on said sheet in an aligned series transverse to the direction of advancement and adapted to periodically separate an aligned series of the eggs from the mass.

2. In a machine for handling eggs, a stationary flexible sheet on which the eggs are deposited en masse, an endless series of advancing rollers beneath said sheet forming a support for the eggs between adjacent rollers adapted to exert a limited forward pressure thereon, and a rotary gate normally positioned to arrest movement of the eggs on said sheet in an aligned series transverse to the direction of advancement and adapted upon rotation thereof to separate said aligned series of eggs from the mass.

3. In a machine for handling eggs, a stationary flexible sheet on which the eggs are deposited en masse, an endless series of advancing rollers beneath said sheet forming a support for the eggs between adjacent rollers adapted to exert a limited forward pressure thereon, a gate for temporarily arresting movement of the eggs on said sheet in an aligned series transverse to the direction of advancement and adapted to periodically separate said aligned series of the eggs from the mass, and conveyor means on which said series of eggs is deposited adapted to advance the same in the direction of alignment to a predetermined point for further handling.

4. In a machine for handling eggs, means for separating from a mass an aligned series of eggs, conveyor means on which said separated series is deposited and means for controlling the operation of said separating means including a light sensitive electric cell, means for projecting a light beam diagonally across the path of eggs on said conveyor means and into said cell, and means for operating said separating means whenever said cell is energized, whereby an advancing series of eggs will obstruct said light beam and said separating means will be operated only when said obstruction is removed to deposit another series on said conveyor means.

5. In a machine for handling eggs, a support for a mass of eggs, means for non-positively advancing the eggs over said support, a gate forming an obstruction in the path of advancement against which eggs accumulate to form an adjacent stationary row, and means for intermittently opening said gate to release and separate said row of eggs from the mass.

6. In a machine for handling eggs, a support for a mass of eggs in a substantially horizontal plane, means for non-positively advancing the eggs over said support, a gate forming an obstruction in the path of advancement against which the eggs accumulate to form an adjacent stationary row, means for intermittently opening said gate to release and separate said row of eggs from the mass, and a conveyor in substantially the plane of said support on which the released row is deposited without dropping for advancing the same longitudinally to a point for further handling.

7. In a machine for handling eggs, a flexible sheet on which eggs are deposited, an endless series of advancing rollers beneath said sheet supporting the same and the eggs thereon and adapted to yieldably advance the eggs over said sheet, some of said rollers being helically grooved in portions thereof to also advance the eggs transversely of the sheet and axially of the rollers.

8. In a machine for handling eggs, a flexible sheet on which eggs are deposited, an endless series of advancing rollers beneath said sheet supporting the same and the eggs thereon and adapted to yieldably advance the eggs over said sheet, some of said rollers being helically grooved in opposite end portions thereof and with opposite leads being adapted to advance the eggs from the sides to the center of said sheet.

9. In a machine for handling eggs, a support for a mass of eggs, means for non-positively advancing the eggs over said support, a gate forming an obstruction in the path of advancement and against which eggs accumulate to form an adjacent stationary row, means for intermittently opening said gate to release and separate said row of eggs from the mass, a conveyor on which the separated row is deposited, and controlling means for the operation of said gate adapted to open the same to deposit another row of eggs on said conveyor only when the previously deposited row has been advanced beyond a predetermined point to provide clearance on said conveyor for deposit of another row.

10. In a machine for handling eggs, a support for a mass of eggs, means for non-positively advancing the eggs over said support, a rotary gate having a plurality of radially extending angular spaced blades, one of which forms an obstruction in the path of advancement against which the eggs accumulate to form an adjacent stationary row, and means for intermittently partially rotating said gate to remove the obstructing blade and to separate from the mass and transfer said adjacent row by movement of a succeeding blade, which latter is then positioned to form an obstruction against which another stationary row of eggs accumulates.

11. In a machine for handling eggs, means for successively separating from a mass aligned series of eggs and conveyor means for longitudinally advancing said series comprising a pair of spaced parallel travelling belts on which each separated series is laterally deposited, the eggs thereof bridging the space between said belts and forming driving contact with each.

12. The construction as in claim 11 in which said belts are flat and in the same plane.

References Cited in the file of this patent

UNITED STATES PATENTS

| Number | Name | Date |
|---|---|---|
| 724,240 | Baker | Mar. 31, 1903 |
| 952,352 | Pieper | Mar. 15, 1910 |
| 1,078,110 | Stamm | Nov. 11, 1913 |
| 1,199,818 | Peck | Oct. 3, 1916 |
| 1,200,244 | Sears | Oct. 3, 1916 |
| 1,514,281 | Grubb | Nov. 4, 1924 |
| 1,599,553 | Clairemont | Sept. 14, 1926 |
| 1,892,670 | Jaeger | Jan. 3, 1933 |
| 1,983,893 | Barton | Dec. 11, 1934 |
| 2,020,511 | McHenry | Nov. 12, 1935 |
| 2,045,767 | Funk | June 30, 1936 |
| 2,052,001 | Platt | Aug. 25, 1936 |
| 2,070,980 | Wyland | Feb. 16, 1937 |
| 2,081,441 | Willshaw | May 25, 1937 |
| 2,102,248 | Yeakel | Dec. 14, 1937 |
| 2,135,778 | Wyland | Nov. 8, 1938 |
| 2,175,262 | Haugh | Oct. 10, 1939 |
| 2,488,230 | Page | Nov. 15, 1949 |
| 2,497,655 | Bramson | Feb. 14, 1950 |
| 2,520,610 | Powell | Aug. 29, 1950 |
| 2,588,787 | Wright | Mar. 11, 1952 |